United States Patent [19]
Jackson

[11] 3,729,901
[45] May 1, 1973

[54] EMISSION AND POLLUTANT RECOVERY PROCESS AND APPARATUS

[76] Inventor: Dennis Hurshal Jackson, 850 West Osborn Road, Phoenix, Ariz. 85013

[22] Filed: July 20, 1971

[21] Appl. No.: 164,364

Related U.S. Application Data

[63] Continuation-in-part of Ser. No. 888,021, Feb. 3, 1970, abandoned.

[52] U.S. Cl. ............................55/244, 55/DIG. 30
[51] Int. Cl. ............................B01d 47/02
[58] Field of Search ..............55/DIG. 30, 95, 220, 55/244, 256, 257-260, 431, 444-446; 110/165 A, 119; 261/17, 126

[56]              References Cited

UNITED STATES PATENTS

| | | | |
|---|---|---|---|
| 2,609,190 | 9/1952 | Jackson | 55/244 |
| 233,505 | 10/1880 | Hall | 261/17 |
| 2,721,065 | 10/1955 | Ingram | 55/244 |
| 243,285 | 6/1881 | McDaniels | 55/446 |
| 688,693 | 12/1901 | Richter | 110/125 |
| 895,009 | 8/1908 | Gooch | 55/431 |
| 1,044,501 | 11/1912 | Crawford | 55/DIG. 20 |
| 1,002,564 | 9/1911 | Cole | 55/431 |
| 1,202,953 | 10/1916 | Adams | 55/423 |

FOREIGN PATENTS OR APPLICATIONS

| | | | |
|---|---|---|---|
| 4,636 | 2/1913 | Great Britain | 261/126 |

Primary Examiner—Charles N. Hart
Attorney—Richard C. Sughrue et al.

[57]              ABSTRACT

The recovery apparatus includes a collector device which may be connected to the exhaust flue or a furnace or disposed in a relatively confined area for collecting the exhaust gases or surrounding contaminated air. The collector device is connected by a conduit to a suction-blower device which may be comprised of two suction-blowers disposed in parallel for reliability. A pair of liquid filled tanks are provided and conduits are connected at one end to the suction-blower device with the opposite ends being disposed beneath the surface of the liquid. The process involves drawing the exhaust gases or contaminated air into the collector device by means of the suction-blower device and bubbling the exhaust gases or contaminated air through the liquid in the tank to remove all contaminates therefrom.

4 Claims, 6 Drawing Figures

EMISSION AND POLLUTANT RECOVERY PROCESS AND APPARATUS

This application is a continuation-in-part of Ser. No. 888,021 filed Feb. 3, 1970 and now abandoned.

BACKGROUND OF THE INVENTION

1. Field of the Invention

This invention is directed to an apparatus for entraining and purifying contaminated gases. More specifically, the present invention is directed to a process and apparatus wherein the contaminated gases are collected by means of a suction device and bubbled through liquid filled tanks to remove the contaminates.

2. Prior Art

Various collector devices have been used in the past in conjunction with wood and coal burning locomotives to trap burning cinders and return them to the fire box to prevent the ignition of brush fires along the railroad right-of-way.

It is also known in the prior art to separate a metal from ore by sublimating the metal and subjecting the vapors to a shower bath to condense the metal which is then collected in a sediment tank.

SUMMARY OF THE INVENTION

The present invention provides an emission and pollutant recovery apparatus wherein the contaminates are positively collected by means of a suction device and conveyed under positive pressure through conduits to liquid filled tanks where the contaminates are removed by bubbling the contaminated air through the liquid.

The present application provides an emission and pollutant recovery apparatus which is extremely efficient and relatively inexpensive both in construction and operation.

The present invention provides collector devices for contaminated air which may be installed directly on exhaust flues or mounted in a relatively confined space for collecting the surrounding air. The collector devices which are suitable for mounting directly on the exhaust flue of a furnace or the like, may be provided with baffle plates for deflecting particulate matter as the exhaust gases follow a tortuous course through the collector device to the atmosphere or may provide a completely closed connection to collect all gases and contaminates issuing from the exhaust flue.

The present invention provides an emission and pollutant recover apparatus which is suitable for reliable and continuous operation. Dual suction-blowers are provided in parallel for alternate operation in the event of the failure of one of the units and dual liquid-filled recovery tanks are provided with means for alternately directing the contaminated gases to one tank while the other is being recycled.

The foregoing and other objects, features and advantages of the invention will be apparent from the following more particular description of preferred embodiments of the invention as illustrated in the accompanying drawings.

DETAILED DESCRIPTION OF THE INVENTION

The emission and pollutant recovery apparatus according to the present invention is comprised of three principal sections, namely, the collector section, the suction-blower section and the recovery tank section. The collector section of the apparatus may be varied depending upon the installation involved.

Figure 1:
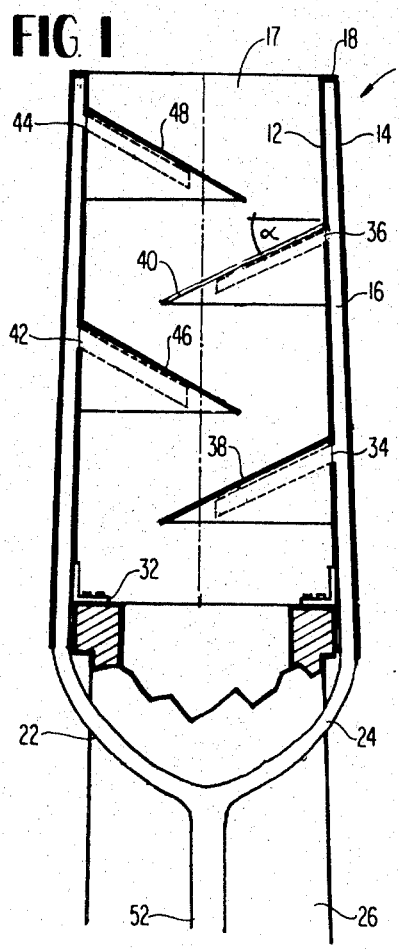
FIG. 1 is a side elevation view, partly in section, of a collector cone according to the present invention.
Figure 2:
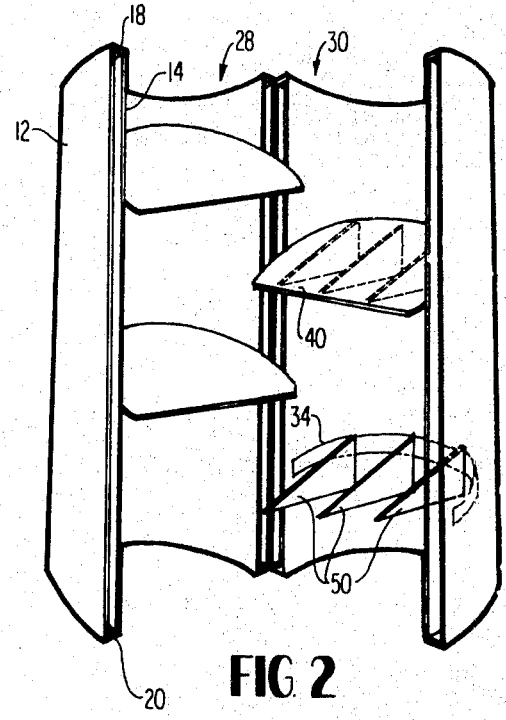
FIG. 2 is a perspective view of the two halves of the collector cone shown in FIG. 1.

A first form of the collector device is shown in FIGS. 1 and 2 and is comprised of a collector cone 10 comprised of inner and outer spaced-apart frusto-conical walls 12 and 14 which define a continuous frusto-conical annular chamber 16 and a central chamber 17. The upper end of the annular chamber 16 is closed by means of an annular plate 18 and the lower end is closed by means of an annular plate 20. A pair of outlet conduits 22 and 24 are secured to the lower plate 20 and extend through the end wall in communication with the interior of the annular chamber 16. The collector cone 10 may be secured to an exhaust flue or pipe 26 of a furnace, or the like, by any suitable means. In the embodiment shown in FIG. 1, a collector cone is bolted or riveted to the upper end of the part 26 by means of a flange 32 secured to the interior of the inner wall 12. It is obvious that other means may be utilized for securing the collector cone to the pipe, such as welding.

The collector cone 10 is formed of two halves 28 and 30 as thus shown in FIG. 2 and each half is provided with a set of vertically spaced elongated parallel horizontally disposed slots. Slots 34 and 36 are formed in cone half 30 and slots 42 and 44 are formed in cone half 28. When the two halves of the cone are secured together by means of welding, or the like, the two sets of slots will be diametrically opposed to each other with the slots 34 and 36 of one set being disposed intermediate the slots 42 and 44 of the other set. Flat baffle plates 28, 40, 46 and 48 are secured to the inner wall 12 along the top edge of each slot 34, 36, 42 and 44, respectively. The flat baffle plates extend downwardly and inwardly in the central chamber 17 and each plate extends more than halfway across the diameter of the central chamber so that the baffle plates overlap each other. This overlap is most clearly shown in FIG. 1 of the drawings. The angle $\alpha$ between each baffle plate and the horizontal is approximately 25°. In order to provide additional rigidity to the baffle plates, gussets 50 may be welded to the inner wall 12 and the underside of each baffle plate, as best shown in FIG. 2.

The two baffle plates 22 and 24 are connected to a single outlet conduit 52 having a diameter approximately twice as large as the diameters of the two outlet pipes 22 and 24. The upper end of the central chamber may be left open for the escape of hot air from which particulate matter has been removed during the tortuous flow of the air around the baffle plates. It is also possible to provide a cover for the central chamber 17 if it is desired to capture all of the gases and their entrained contaminates which emanate from the pipe 26.

Figure 3:
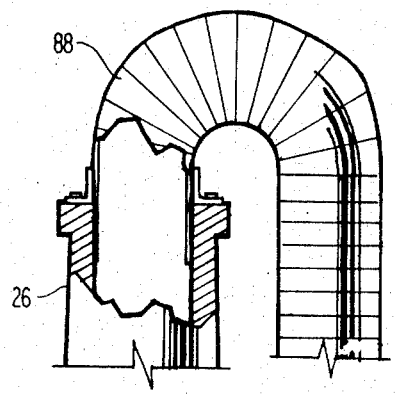
FIG. 3 is a side elevation view, partly in section, of a modified form of collector device according to the present invention.
Figure 4:
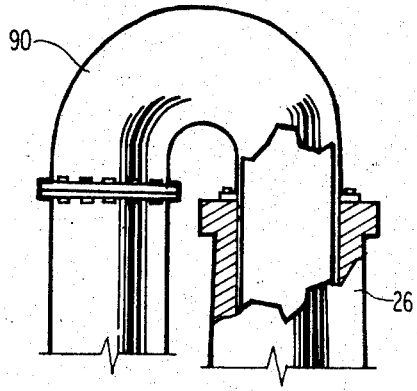
FIG. 4 is a side elevation view, partly in section, of a still further modified form of collector device according to the present invention.

If it is desired to capture all the gases and their entrained contaminates emanating from an exhaust pipe, it may only be necessary to use a closed conduit such as the flexible conduit 88 shown in FIG. 3 or the rigid conduit 90 as shown in FIG. 4. These conduits may be secured directly to the end of the exhaust pipe 26 by bolting, riveting, welding, or the like.

Figure 5:
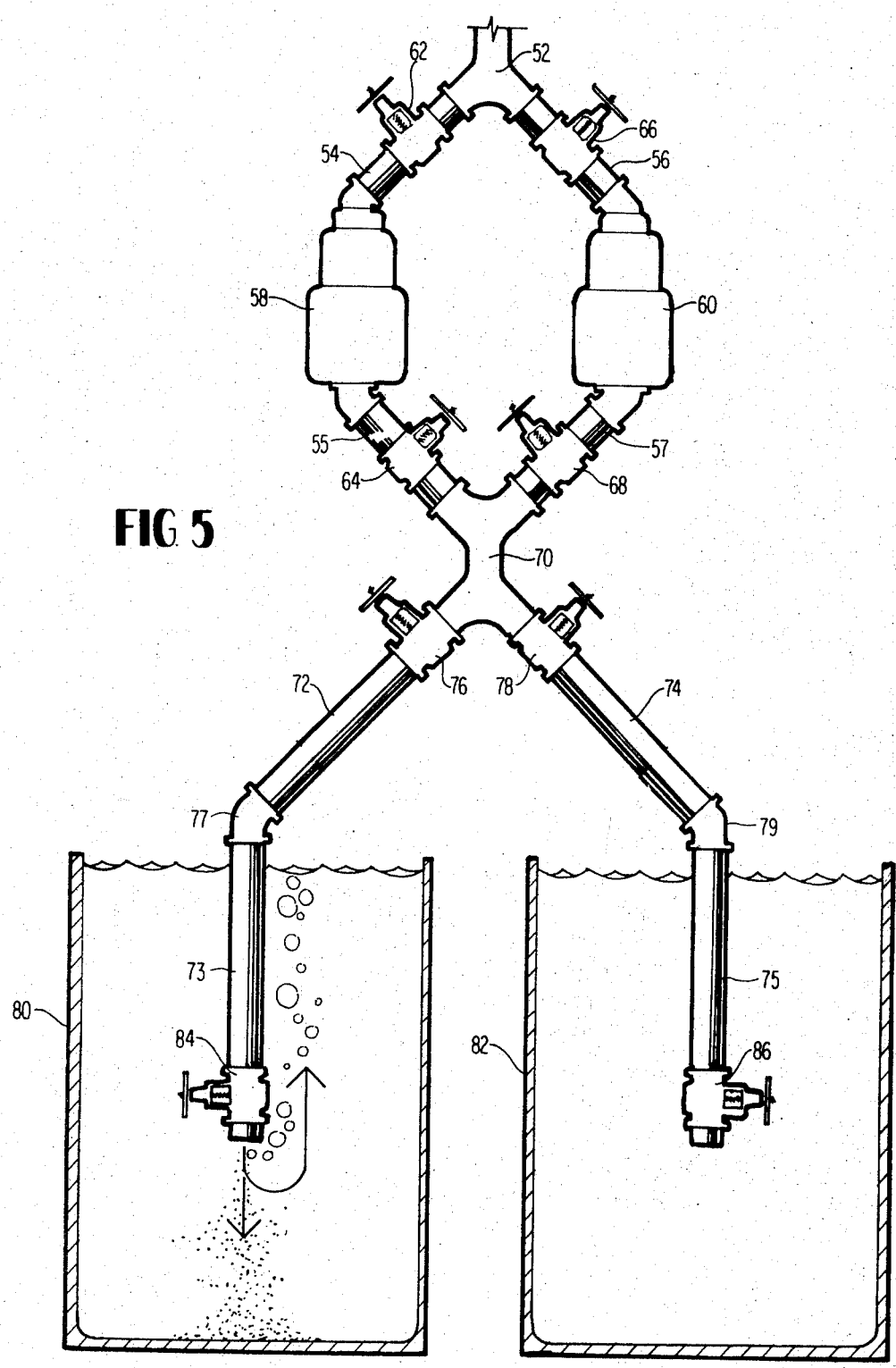
FIG. 5 is an elevational view of the conduits, suction-blower devices and recovery tanks according to the present invention.

In FIG. 5, the suction-blower arrangement and the recovery tank arrangement are shown in detail. The outlet conduit 52, which is a continuation of the conduit 52 shown in FIG. 1, or a continuation of the conduits 88 and 90 shown in FIGS. 3 and 4, is provided with a V to which two smaller diameter conduits 54 and 56 are connected. Shut-off valves 62 and 66 are mounted in the conduits 54 and 56 for controlling the flow of gases to suction-blower devices 58 and 60, which are connected to the conduits 54 and 56. The suction side of the suction-blower devices 58 and 60 are connected to the conduits 54 and 56 and the blower side of the suction-blower devices are connected to conduits 55 and 57. Control valves 64 and 68 are provided in conduits 55 and 57 and these conduits are connected to a substantially X-shaped coupling 70. Conduits 72 and 74 are connected to the opposite end of the X-shaped coupling 70 and are provided with control valves 76 and 78. The conduits 72 and 74 are connected to conduits 73 and 75 by means of elbows 77 and 79. The conduits 73 and 75 are each provided with control valves 84 and 86. The lowermost end of conduits 73 and 75 are disposed beneath the surface of a liquid in tanks 80 and 82.

In the operation of the emission and pollutant recovery apparatus, one of the suction-blower devices 58 or 60 is energized by a suitable control circuit (not shown). The details of the suction-blower devices are conventional in the art, as are the control circuits for operating the same and, therefore, it is not deemed necessary to describe these in detail. The other suction-blower device, is maintained in reserve, should the operating suction-blower device fail. In this way, the reliability of the apparatus is greatly improved and there is no danger of having to exhaust contaminated gases into the atmosphere during a breakdown.

Assuming the suction-blower device 58 is energized, the valves 62 and 64 will be opened and the valves 66 and 68 will be closed. The suction will be applied through the conduits 54, 52, 22, 24 and annular chamber 16 to draw the contaminated exhaust gases from the central chamber 17 through the slots 34, 36, 42 and 44 into the chamber 16. In the event the collector devices of FIG. 3 and FIG. 4 are utilized, the suction will be applied through the conduits 52 and 54 to conduits 88 or 90 to collect all of the contaminated gases emanating from the exhaust pipe 26. The contaminated gases are then blown under positive pressure by the suction-blower 58 through the conduit 55, coupling 70 into one or both of the liquid filled tanks 80 or 82.

Generally, the gases are directed to one tank or the other, so that one tank may be cleaned while the other tank is operating to collect the contaminates. According to the arrangement shown in FIG. 5, the exhaust gases are being directed through the liquid in tank 80 and the valves 78 and 86 in the conduits leading to tank 82 would be closed. By bubbling the exhaust gases through the liquid in the tank, the heavier particles will immediately fall to the bottom and the lighter particles will form a scum on the surface of the liquid. The bubbling process also tends to remove noxious odors and fumes from the gases prior to passing the exhaust gases to the atmosphere. Depending upon the nature of the exhaust gases and the nature of the liquid used in the tank, various toxic elements may be removed from the exhaust gases by chemical combination with the liquid in the tank. It is obvious that any number of collector cones or collector conduits may be coupled to the outlet conduit 52 and it is also obvious that more than two tanks may be utilized in the recovery process.

Figure 6:
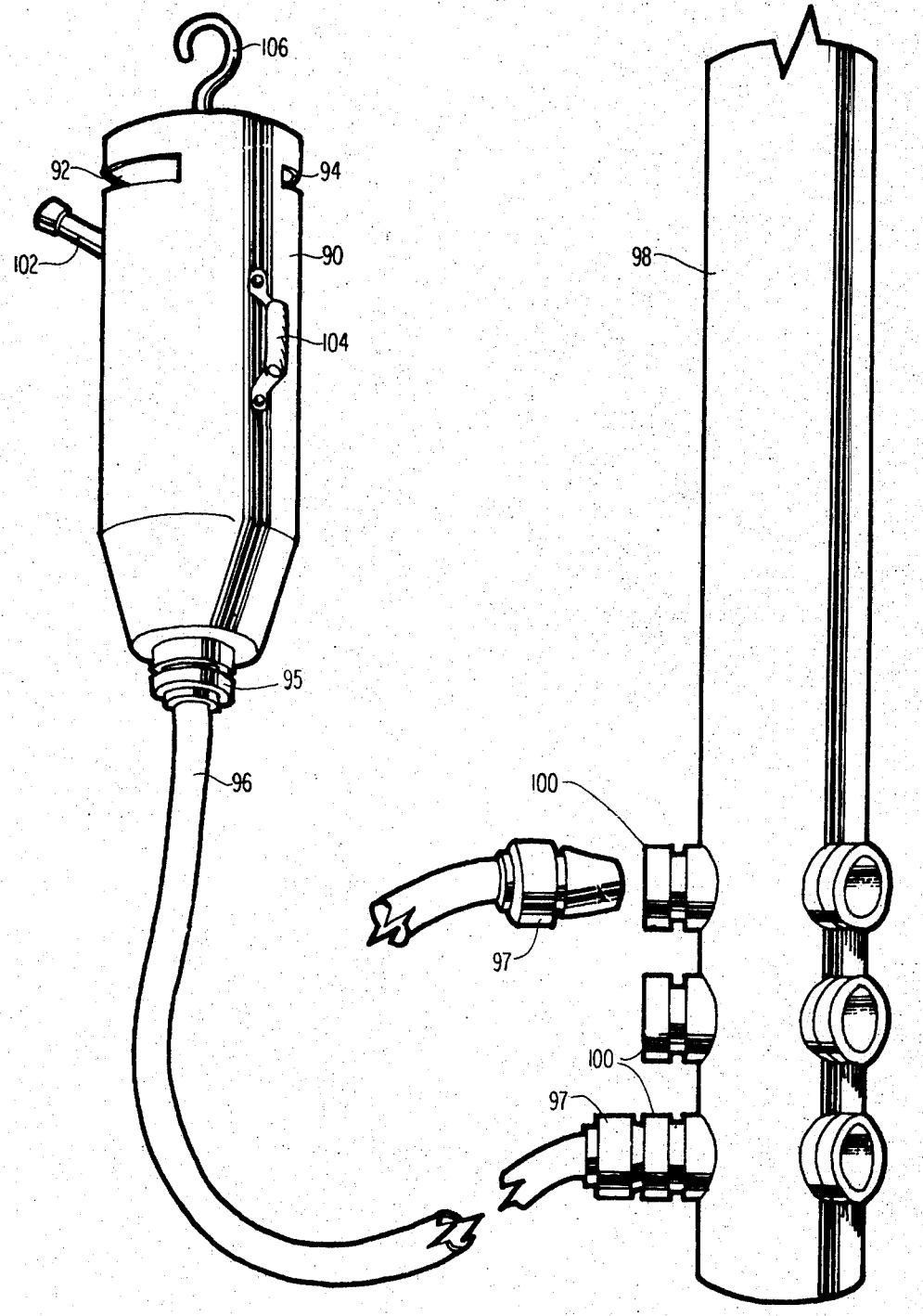
FIG. 6 is a perspective view of a modified form of collector device suitable for use in a relatively confined space.

The foregoing embodiments have all been directed to collector devices suitable for use with an exhaust pipe to collect the gases emanating therefrom. However, it is often necessary to remove contaminated air or gases from a relatively confined space, such as a coal mine or a dust filled room. In such an installation, the collector devices shown in FIG. 1-4 inclusive would not be suitable and the collector device shown in FIG. 6, may be utilized. The collector device shown in FIG. 6 may be comprised of a cannister 90, which may be of cylindrical configuration or any other suitable configuration. The cannister 90 is provided with a plurality of slots 92 and 94 for communicating the hollow interior of the cannister with the surrounding atmosphere. A hook 106, or any other suitable means may be provided for mounting the cannister in the confined space. It is also possible to provide some sort of tri-pod arrangement or any other suitable base for mounting the cannister on the ground or floor of the confined space. Additional support arms, such as arm 102 may also be connected to the cannister 90. A handle 104 may also be provided for transporting the cannister from one place to another. The cannister is provided with an outlet coupling 95, which is coupled to a flexible conduit 96. The conduit 96 may be provided with a snap action type coupling 97 at the opposite end thereof for connecting the same to a complementary type coupling 100 which is secured to and communicates with the interior of a principal exhaust conduit 98. Although a snap-type fitting has been shown in FIG. 6, it is obvious that any other type coupling may be utilized for connecting the conduit 96 to the conduit 98. Likewise, any number of coupling fittings 100 may be mounted on the conduit 98 at any desired location along the length thereof. In this way, a plurality of cannisters 90 may be connected to the exhaust conduit along the length thereof. This would be especially suitable for use in a mine wherein the conduit 98 would be disposed in the mine shaft and the portable cannisters 90 could be carried into the various horizontal shafts branching off from the main shaft. Depending upon the distance of the cannister 90 from the principal conduit 98, it would also be possible to utilize a plurality of additional intermediate conduits between the conduit 96 and the conduit 98 with each of the intermediate conduits having a coupling fitting complementary to the coupling fittings 97 and 100 shown in FIG. 6.

While the invention has been particularly shown and described with reference to several preferred embodiments thereof, it will be understood by those skilled in the art, that various changes in form and details may be made therein without departing from the spirit and scope of the invention.

What is claimed is:

1. An emission control device for removing contaminates from exhaust gases emitted from an exhaust pipe comprising collector means for collecting the contaminated exhaust gases, said collector means comprising inner and outer spaced apart frusto-conical walls defining a continuous frusto-conical annular chamber and a central chamber defining an inlet at the wider end, spaced end wall means secured to said inner and said outer walls to close said annular chamber, means for securing the end of said collector means adjacent the wider end of the frusto-conical walls to an exhaust pipe whereby exhaust gases from the exhaust pipe may be introduced into said central chamber through said inlet, said inner wall being formed with two sets of vertically spaced elongated parallel horizontally disposed slots with the slots of one set being disposed diametrically opposite and intermediate the slots of the other set, spaced flat baffle means secured to the inner wall along the top edge of each of said slots extending downwardly and inwardly in said central chamber for deflecting particulate contaminates toward said slots, said flat baffle means each extending more than halfway cross the diameter of said central chamber so that said baffle means adjacent each set of slots overlap each other, outlet means extending through said end wall means at the wider end of the frusto-conical walls, pipe means connected to said outlet means, exhaust blower means connected to said pipe means, liquid container means and additional pipe means connected at one end to said blower means and extending into said liquid container means so that it may be normally disposed beneath the level of the liquid when the container is filled with liquid to a predetermined level whereby said exhaust blower means will draw the contaminated gases from said central chamber, through said slots and said frusto-conical annular chamber and blow the contaminated exhaust gases through the liquid in the container to remove the contaminates.

2. An emission control device as set forth in claim 1 wherein said pipe means is comprised of two pipes connected to said outlet means at opposite sides of said annular chamber and a third pipe connected to said blower means at one end to said two pipes at the other end.

3. An emission control device as set forth in claim 1 wherein said liquid container means is comprised of two containers and wherein said additional pipe means is comprised of two separate pipes each of which may be normally disposed with the free end thereof beneath the level of the liquid when the containers are filled with liquid to a predetermined level and valve means associated with each of said two pipes for controlling the flow of gases to said containers.

4. An emission control device for removing contaminates from exhaust gases emitted from an exhaust pipe comprising contaminated air collecting means, suction-blower means, first conduit means connecting said collecting means to the suction side of said suction-blower means, liquid container means, second conduit means connected at one end to the blower side of said suction-blower means with the other end thereof disposed in said container means at a level below the ordinary liquid level when said container means is filled with liquid, said suction-blower means being comprised of two suction-blower units connected in parallel between said first and second conduit means and valve means in said conduits for selectively controlling the flow of air through said units, and said liquid container means being comprised of at least two liquid containers and said second conduit means is provided with at least two branch conduits each leading to a liquid container and further comprising valve means in said branch conduits to selectively control the flow of air to said containers.

* * * * *